(12) United States Patent
Xu et al.

(10) Patent No.: US 11,976,812 B1
(45) Date of Patent: May 7, 2024

(54) LED LAMP HAVING MODULAR HOUSING

(71) Applicant: SHENZHEN SNC OPTO ELECTRONIC CO., LTD, Shenzhen (CN)

(72) Inventors: Jianjun Xu, Shenzhen (CN); Liang Qiu, Shenzhen (CN); Xianjun Li, Shenzhen (CN); Jianyong Xu, Shenzhen (CN)

(73) Assignee: SHENZHEN SNC OPTO ELECTRONIC CO., LTD, Shenzhen (CN)

( * ) Notice: Subject to any disclaimer, the term of this patent is extended or adjusted under 35 U.S.C. 154(b) by 0 days.

(21) Appl. No.: 18/214,539

(22) Filed: Jun. 27, 2023

(30) Foreign Application Priority Data

Dec. 11, 2022 (CN) .......................... 202223337447.7

(51) Int. Cl.
*F21V 29/76* (2015.01)
*A01G 7/04* (2006.01)
*F21V 23/00* (2015.01)
*F21Y 115/10* (2016.01)

(52) U.S. Cl.
CPC ............ *F21V 29/763* (2015.01); *A01G 7/045* (2013.01); *F21V 23/002* (2013.01); *F21Y 2115/10* (2016.08)

(58) Field of Classification Search
CPC .... F21K 9/20; F21S 8/04; F21V 15/01; F21V 15/013; F21V 23/003; F21V 23/007; F21V 23/008; F21V 29/70; F21V 29/74
See application file for complete search history.

(56) References Cited

U.S. PATENT DOCUMENTS

| | | | | |
|---|---|---|---|---|
| 7,686,469 B2* | 3/2010 | Ruud | ...................... | F21S 2/005 362/249.02 |
| 7,771,087 B2* | 8/2010 | Wilcox | ................... | F21S 8/086 362/249.02 |
| 7,780,318 B2* | 8/2010 | Xiao | ...................... | F21V 29/763 362/427 |
| 8,021,024 B2* | 9/2011 | Huang | ................... | F21V 15/013 362/267 |
| 8,029,162 B2* | 10/2011 | Curran | .................... | F21V 31/04 362/373 |
| 8,092,049 B2* | 1/2012 | Kinnune | ................. | F21V 31/03 362/373 |
| 8,109,647 B2* | 2/2012 | Soo | ........................ | F21V 29/70 362/240 |
| 8,851,711 B2* | 10/2014 | Ladewig | ............... | F21V 29/713 362/249.02 |
| 9,194,568 B2* | 11/2015 | Moriyama | .............. | F21V 21/30 |
| 9,593,837 B2* | 3/2017 | Wilcox | ................... | H05B 45/24 |
| 9,890,945 B2* | 2/2018 | Lazalier | ................... | F21K 9/60 |

(Continued)

*Primary Examiner* — Ismael Negron (57) ABSTRACT

An LED lamp includes a heat sink; an LED module fixed to the heat sink; a lampshade positioned over the heat sink and covering the LED module; a frame; and a power supply. The frame includes at least two elongated hollow elements, and two end covers cooperatively clamping the two hollow elements to define an interior cavity. The LED module, the heat sink and the lamp shade forming at least one lamp module received in the interior cavity. The power supply is provided in at least one of the hollow members. The frame is configured to form LED lamps of different lengths, and to receive a plurality of different lamp modules.

14 Claims, 8 Drawing Sheets

(56) References Cited

U.S. PATENT DOCUMENTS 10,520,167 B2 * 12/2019 Duckworth ............. F21V 15/01
2013/0088869 A1 * 4/2013 Yun ....................... F21V 29/507
362/249.01

* cited by examiner

LED LAMP HAVING MODULAR HOUSING

CROSS-REFERENCE TO RELATED APPLICATION

This application claims priority to Chinese Patent Application No. 202223337447.7, entitled "LED PLANT GROWING LAMP" and filed on Dec. 11, 2022, the content of which is hereby incorporated by reference in its entirety.

BACKGROUND

1. Technical Field

The present disclosure generally relates to the field of lighting devices, and especially relates to an LED lamp having a modular housing with flexible and variable usage applications, a good heat dissipation effect and a compact structure.

2. Description of Related Art

Plant growing lamps can be used to provide necessary light for photosynthesis of indoor plants. A conventional plant growing lamp generally includes a heat sink, a power supply installed on the heat sink, at least one LED module, and a lampshade covering on the LED module to be acted as a diffuser.

The conventional plant growing lamp has the following disadvantages.

Firstly, the power supply is installed on the heat sink, so that a height of the plant growing lamp is relatively great and difficult to reduce a size of the plant growing lamp, resulting in needing a larger installation space for installing the plant growing lamp; in addition, higher transportation costs is also occurred during transportation of the plant growing lamp.

Secondly, when designing the plant growing lamp, it is necessary to design heat sinks with different sizes based on different capacities. For example, a size of the heat sink with a capacity of 90 W that is arranged on the plant growing lamp is different from a size of the heat sink with a capacity of 60 W that is arranged on the plant growing lamp, in this way, a plurality of molds is required; additionally, the heat sinks with different capacities and models are not interchangeable thereamong. When the heat sink with a high capacity that is arranged on the plant growing lamp is failed, the heat sink can't be directly replaced; universality of components of the heat sink is low, and the heat sinks with different models and sizes need to be prepared separately, which is not conducive to reducing inventory of raw materials.

Thirdly, after the plant growing lamp is completely designed, the size of the plant growing lamp has been determined, and LED panels and LED beads of the plant growing lamp have also been determined, which is impossible to obtain a higher brightness by adding the number of LED beads in a later stage; if luminous intensity of the plant growing lamp needs to be adjusted, the heat sinks with different sizes need to be redeveloped. Due to a complex shape of the heat sink, a long development time and a high cost of the heat sink, research and development costs and production costs will be significantly increased.

SUMMARY

The technical problems to be solved: in view of the shortcomings of the related art, the present disclosure provides an LED lamp having a modular housing which can solve problems that heat sinks in conventional technologies has low universality, resulting in being impossible to flexibly increase the number of lamp modules, and conveniently change luminous intensity with different capacities according to actual requirements; and a size of the LED lamp in conventional technologies is too large to be miniaturized, resulting in increasing transportation costs and limiting installations.

In order to implement the above technical purpose, a technical solution provided by the present disclosure is:

an LED lamp having a modular housing according to an embodiment of the present disclosure includes at least one lamp module having a heat sink, an LED module fixed to the heat sink, and a lampshade positioned over the heat sink to cover the LED module.

Specifically, in the present disclosure, the LED lamp includes at least one lamp module installed in a frame, and the frame is configured to fix the at least one lamp module and set a required length of the LED lamp according to the number of lamp modules, so as to install the at least one lamp module according to different brightness requirements.

Wherein the frame includes two connecting pipes and two end covers clamping the two connecting pipes to cooperatively form a receiving room therebtween, wherein the at least one lamp module is provided in the receiving room, and the power supply is electrically connected to the LED module; and wherein each of the two connecting pipes further comprises an outer plate and an inner plate, wherein both ends of each outer plate and inner plate are respectively connected to the end cover, with a cavity formed between the outer plate and the inner plate, and the power supply arranged inside the cavity; and wherein the LED lamp comprises a first installation recess extending to both sides of the outer plate along a length direction; a second installation recess extending to both sides of the inner plate along a length direction; a first connecting hole arranged on the end cover and corresponding to the first installation recess; a first screw connecting the first installation recess to the first connecting hole; a second connecting hole arranged on the end cover and corresponding to the second installation recess; and a second screw connecting the second installation recess to the second connecting hole.

The present disclosure provides the advantages as below: the present disclosure provides the frame to fix the lamp module, and the length of the frame can be customized according to the number of lamp modules, which means different lengths of the frame and the lamp modules can be set according to brightness requirements. When a high brightness is required, a longer frame is set to install a larger number of lamp modules within the frame, so as to obtain a higher lighting brightness; when the lighting brightness required is relatively low, a shorter frame is set to install only one lamp module within the frame, so as to obtain the lowest lighting brightness. In addition, structures and sizes of the plurality of lamp modules are completely the same, when one of the plurality of lamp modules is damaged, it can be directly disassembled and replaced, especially the heat sinks received in the plurality of lamp modules are also the same, which is no need to increase the research and development of the heat sink and raw materials procurement. The lamp module has strong universality to be flexibly adapted to customers and minimize costs of raw materials and research and development as much as possible.

Furthermore, the frame is composed of the connecting pipe with the cavity inside the connecting pipe, and the end cover, and the power supply is arranged in the connecting pipe and connected to the LED module through the wire. Compared to a structure that the power supply is arranged on the heat sink, the present disclosure can effectively reduce a height of the plant growing lamp so that the plant growing lamp is flattened, which can reduce transportation costs, has relatively low requirements for installation environments without needing for a larger installation space thereof.

BRIEF DESCRIPTION OF THE DRAWINGS

Reference will now be made in detail to embodiments, examples of which are illustrated in the accompanying drawings.

The element labels according to the embodiments of the present disclosure are as below:

100 LED lamp, 10 lamp module, 101 heat sink, 1011 base, 1012 fin, 1013 heat dissipation channel, E1 via-hole, 102 LED module, 103 lampshade, 20 frame, 21 connecting pipe, 21a outer plate, A3 third vertical surface, B4 fourth transverse surface, B5 fifth transverse surface, C4 fourth installation hole, C5 fifth installation hole, 211 first installation recess, 21b inner plate, A1 first vertical surface, A2 second vertical surface, B1 first transverse surface, B2 second transverse surface, B3 third transverse surface, C1 first installation hole, C2 second installation hole, C3 third installation hole, 212 second installation recess, 22 end cover, 22a first connecting hole, 22b second connecting hole, 221 covering plate, 222 outer frame, 223 inner frame, 2221 inner recess, D1 opening, D2 hanging hole, 30 power supply, 31 Bluetooth device, 32 controller, 33 waterproof junction box, 40 wire, 41 AC connector, 42 control signal connector, 43 toggle switch, 44 reset switch, 50 block, 60 fixing rod, 70 connecting rod, a receiving room, b cavity, x screw, y1 interior angle, y2 exterior angle, z1 first space, z2 second space, p lead-out end.

DETAILED DESCRIPTION

Figure 1:
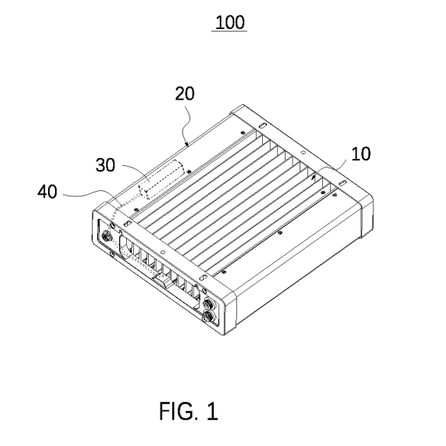
FIG. 1 is a schematic view of an LED lamp in accordance with an embodiment of the present disclosure.
Figure 2:
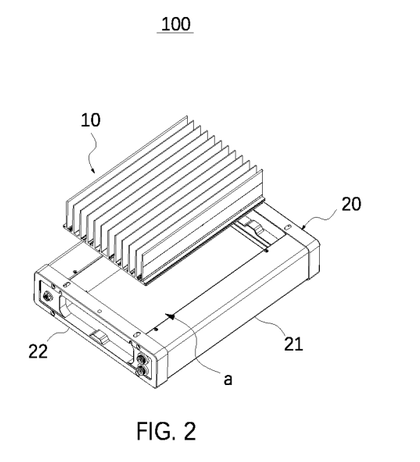
FIG. 2 is an exploded, schematic view of the LED lamp of FIG. 1.
Figure 3:
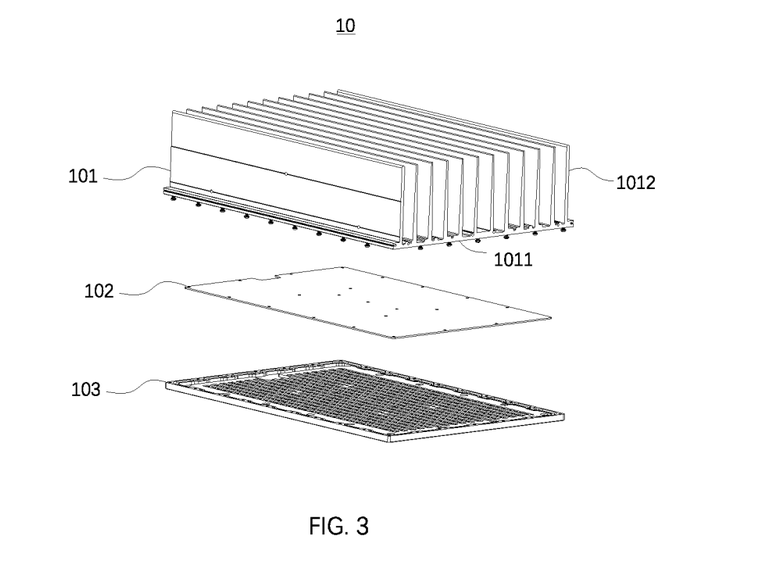
FIG. 3 is an exploded, schematic view of a lamp module of the LED lamp of the present disclosure.

Referring to FIG. 1 to FIG. 3, an LED lamp 100 in accordance with an embodiment of the present disclosure includes a lamp module 10 and a frame 20.

The lamp module 10 includes a heat sink 101, an LED module 102 fixed to the heat sink 101, and a lampshade 103 installed on the heat sink 101 and sealing the LED module 102. The frame 20 includes two connecting pipes 21 and two end covers 22, the two connecting pipes 21 and the two end covers 22 cooperatively clamped and enclosed to form a receiving room a thereamong, the lamp module 10 arranged in the receiving room a, and a power supply 30 arranged in one of the two connecting pipes 21 and electrically connected to the LED module 102 through a wire 40. A length of the frame 20 is set according to a length of one lamp module 10.

In an embodiment of the present disclosure, the length of the frame 20 only meets to install one lamp module 10, so as to obtain the minimum lighting brightness of the LED lamp 100. In addition, the power supply 30 is arranged inside one of the two connecting pipes 21, so that the power supply 30 can be designed as a long-strip shape to adapt to a size of an internal space of the connecting pipe 21. A structure that the power supply 30 arranged inside the connecting pipe 21 can reduce a height of the LED lamp 100, which is beneficial for reducing transportation costs. The LED lamp 100 of the present disclosure only needs to be installed in a space that meets the length and a width of the LED lamp 100, and only needs relatively low requirements for installation environments without needing a larger installation space thereof.

Figure 4:
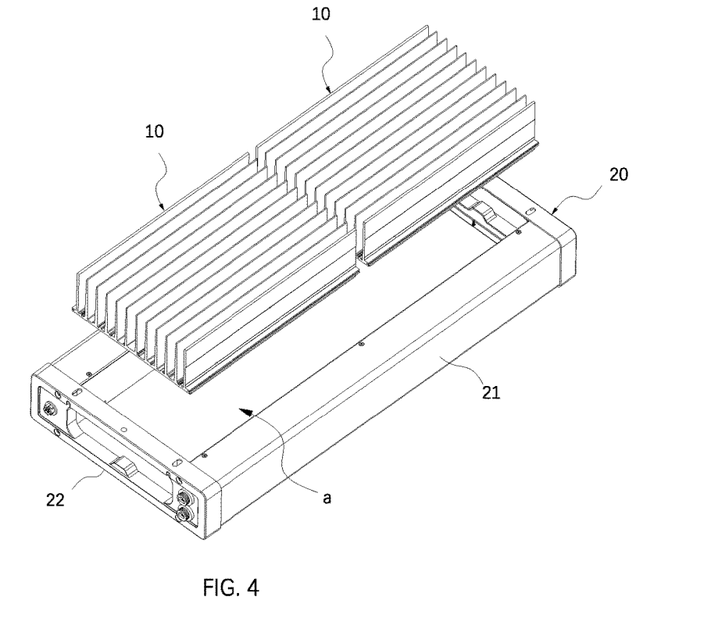
FIG. 4 is a schematic view of an LED lamp in accordance with another embodiment of the present disclosure.

Referring to FIG. 4, in another embodiment of the present disclosure, when a higher lighting brightness is needed for the LED lamp 100, the length of the frame 20 is set to meet a length of two lamp modules 10, at this time, the two lamp modules 10 can increase the lighting brightness of the LED lamp 100.

Sizes of the two lamp modules 10 are the same to improve universality of the lamp module 10, so that the lamp module 10 can be replaced during production. In the later stage, if either of the two lamp modules 10 is damaged, the same lamp module 10 can also directly replace the lamp module 10 that has been damaged. Especially, it is no longer needed to develop the heat sink 101, the lampshade 103 and the LED module 102 with different sizes to meet different requirements of lighting brightness. The heat sink 101, the lampshade 103 and the LED module 102 used to manufacture the LED lamps 100 are universal components, which is beneficial for reducing inventory and material preparation pressures of components with different models and sizes.

In other embodiments of the present disclosure, when the lighting brightness of the LED lamp 100 needs to be further improved, it is only necessary to set the length of the frame 20 to meet requirements of installing three, four, and more lamp modules 10 thereon. After the frame 20 is set, a plurality of universal lamp modules 10 can be directly installed within the receiving room a of the frame 20.

Referring to FIG. 5 to FIG. 9, each of the two connecting pipes 21 includes an outer plate 21a and an inner plate 21b installed on the lamp module 10. Both ends of each of the outer plate 21a and the inner plate 21b are respectively connected to the end cover 22; a cavity b formed between the outer plate 21a and the inner plate 21b, and the power supply 30 arranged inside the cavity b. Both sides of the lamp module 10 along a length direction of the lamp module 10 are respectively fixed on two opposite inner plates 21b.

In the present disclosure, each of the inner plate 21b and the outer plate 21a is an integral metal structure, which can be more conveniently made into the inner plate 21b and the outer plate 21a with different lengths during production, so as to meet lighting brightness requirements of different numbers of lamp modules 10.

Figure 8:
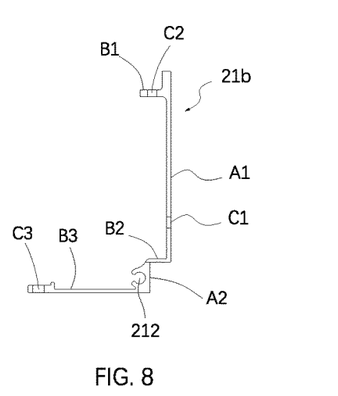
FIG. 8 is a cross-sectional view of an inner plate of the LED lamp of the present disclosure.
Figure 9:
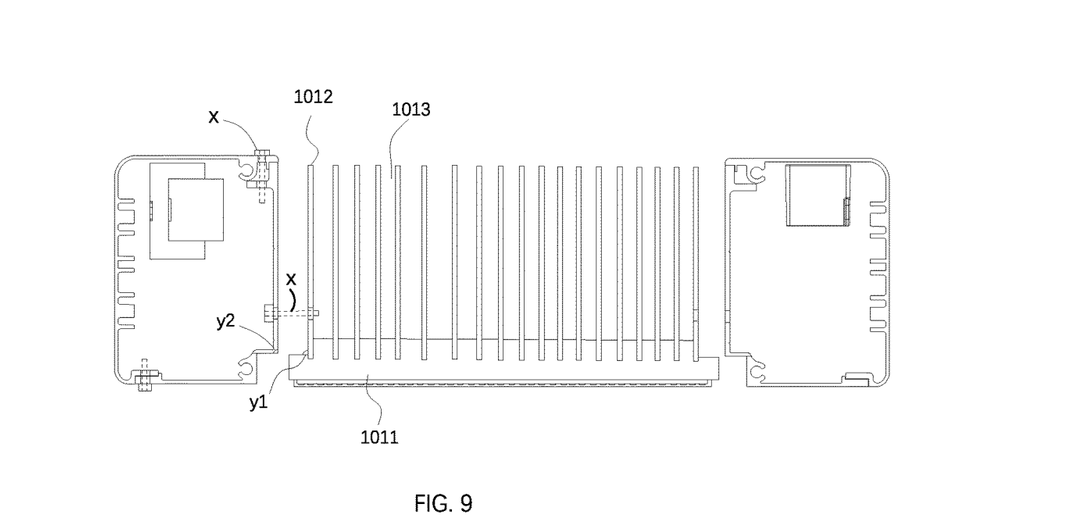
FIG. 9 is an assembly view of a connecting pipe and the lamp module of the LED lamp of the present disclosure.

Referring to FIG. 8 and FIG. 9, the inner plate 21a includes a first vertical surface A1, a first transverse surface B1 and a second transverse surface B2.

The first transverse surface B1 extends from one end of the first vertical surface A1 and is arranged towards the outer plate 21a; and the second transverse surface B2 extends from the other end of the first vertical surface A1 and is arranged towards the outer plate 21a. The first vertical surface A1 includes a plurality of first installation holes C1 arranged at intervals, and the first transverse surface B1 includes a plurality of second installation holes C2 arranged at intervals.

The inner plate 21b is fixed to the lamp module 10 through the plurality of first installation holes C1 engaging with fixing members such as the screws x.

Figure 11:
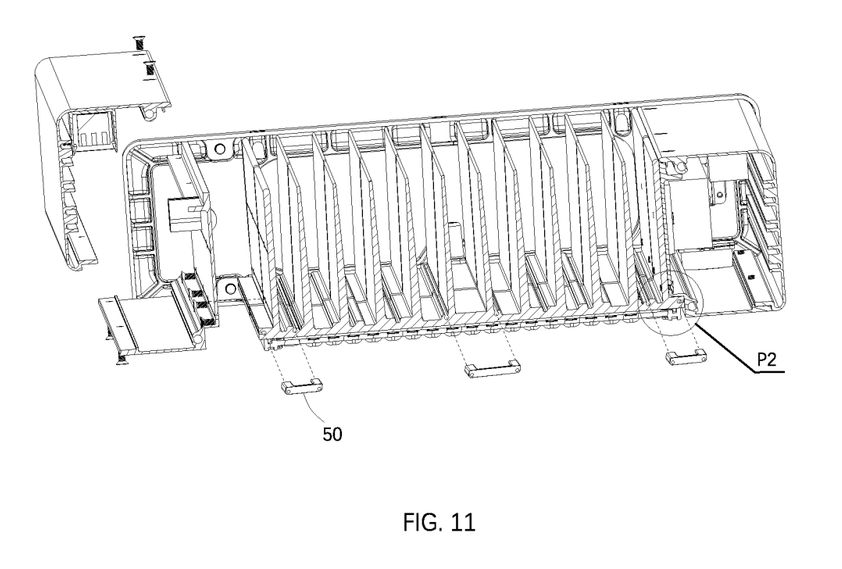
FIG. 11 is an exploded, cross-sectional view of the LED lamp of the present disclosure.

Referring to FIG. 11, in an embodiment of the present disclosure, the inner plate 21b is installed on the heat sink 101 of the lamp module 10. Specifically, the heat sink 101 includes a base 1011 and a plurality of fins 1012.

The base 1011 is fixed to the LED module 102; the plurality of fins 1012 extends from one side of the base 1011 away from the LED module 102 and is integrated with the base 1011. In this way, the integral structure can produce the heat sink 101 with the same size that is standardized and better applicability.

When the inner plate 21b is fixed to the heat sink 101 and the outer plate 21a is fixed to the inner plate 21b, the two connecting pipes 21 can be firmly fixed on sides of the heat sink 101.

Referring to FIG. 9, in order to further improve fixation strength between the connecting pipe 21 and the heat sink 101, ensuring a more secure fixation between the two connecting pipes 21 and the heat sink 101. An interior angle y1 is formed between the base 1011 and one of the plurality of fins 1012 near the inner plate 21b; and an exterior angle y2 is formed between the first vertical surface A1 and the second transverse surface B2; the first vertical surface A1 fixed to the one of the plurality of fins 1012 near the inner plate 21b. The interior angle y1 is coincided with the exterior angle y2, so that the first vertical surface A1 is abutted against the one of the plurality of fins 1012 near the inner plate 21b, and the second transverse surface B2 is abutted against the base 1011, to form tight fixation thereof.

A width of the second transverse surface (B2) is the same as a width from the one of the plurality of fins 1012 near the inner plate 21b to an edge of the base 1011; when the first vertical surface A1 is fixed to the one of the plurality of fins 1012 near the inner plate 21b, an end of the base 1011 is abutted against the second vertical surface A2, to obtain tight fixation thereof.

Figure 12:
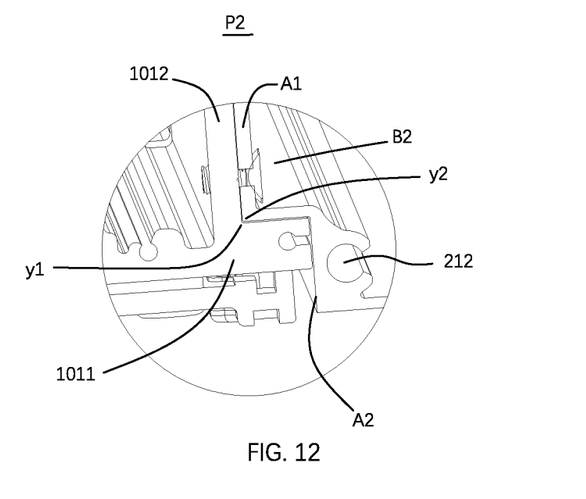
FIG. 12 is a partial enlarged, schematic view of a circle P2 of FIG. 11.
Figure 13:
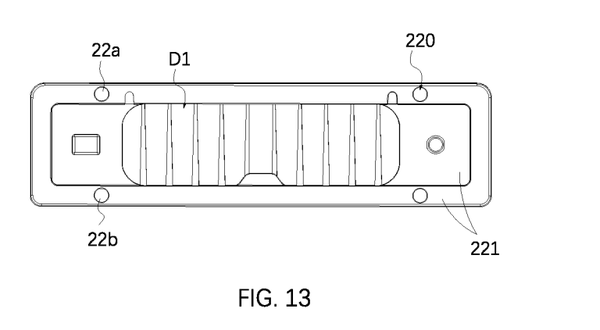
Figure 14:
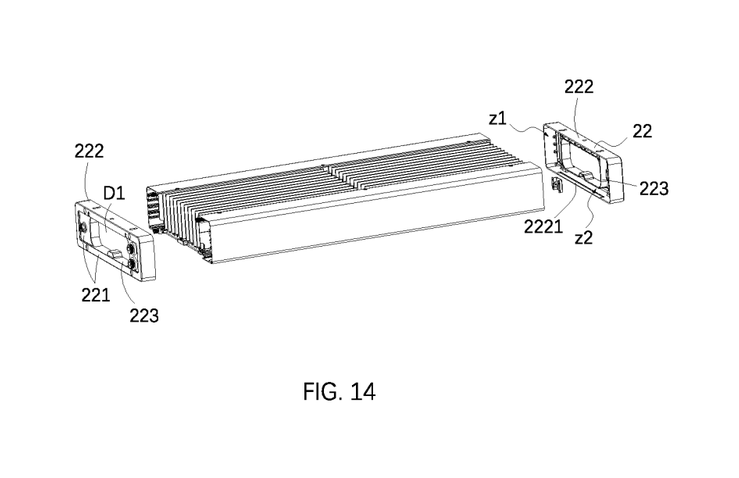
FIG. 14 is an assembly view of the end cover and the lamp module of the LED lamp of the present disclosure.

Referring to FIG. 9 and FIG. 12, the interior angle y1 and the exterior angle y2 are abutted against each other, and the width of the second transverse surface B2 is the same as the width between the edge of the base 1011 to the outermost fin 1012. In this way, after fixing the base 1011 and the fin 1012, the fin 1012 and the inner plate 21b are in contact with each other, which can prevent the inner plate 21b from twisting and deforming due to an external force, to avoid looseness of the inner plate 21b.

When the outer plate 21a is fixed to the inner plate 21b, the inner plate 21b is provided with a special installation position and a structure. Specifically, the inner plate 21b also includes a second vertical surface A2 and a third transverse surface B3.

The second vertical surface A2 extends from an end of the second transverse surface B2 away from the first vertical surface A1, and the third transverse surface B3 extends from an end of the second vertical surface A2 away from the second transverse surface B2; a plurality of third installation holes C3 formed on an end of the third transverse surface A3 away from the second transverse surface A2 and arranged at intervals. The inner plate 21b is fixed to both ends of the outer plate 21a through the plurality of first installation holes C1 and the plurality of third installation holes C3, respectively, to form the cavity b.

When fixing the inner plate 21b and the outer plate 21a, the plurality of first installation holes C1 and the plurality of third installation holes C3 are respectively arranged at both ends of the inner plate 21b to connect to the screws x or fixing members of the outer plate 21a, which can ensure that a connection between the inner plate 21b and the outer plate 21a is relatively tight, so as to effectively avoid a separation of the inner plate 21b and the outer plate 21a.

Referring to FIG. 8 and FIG. 9, furthermore, the outer plate 21a is equipped with a fixing structure that is suitable and matched with the inner plate 21b. Specifically, the outer plate 21a includes a third vertical surface A3, a fourth transverse surface B4, and a fifth transverse surface B5.

The third vertical surface A3 is arranged opposite to the first vertical surface A1; and the fourth transverse surface B4 extends from one end of the third transverse surface B3 and is arranged opposite to the third transverse surface B3. The fifth transverse surface B5 extends from the other end of the third transverse surface B3 and is arranged opposite to the fourth transverse surface B4.

A fourth installation hole C4 is arranged on a side of the fourth transverse surface B4 near the first vertical surface A1, and a fifth installation hole C5 is arranged on a side of the fifth transverse surface B5 near the first vertical surface A1. The fourth installation hole C4 is opposite to the second installation hole C2 and fixed to the second installation hole C2 through the fixing members, and the fifth installation hole C5 is opposite to the third installation hole C3 and fixed to the third installation hole C3 through the fixing members.

Figure 5:
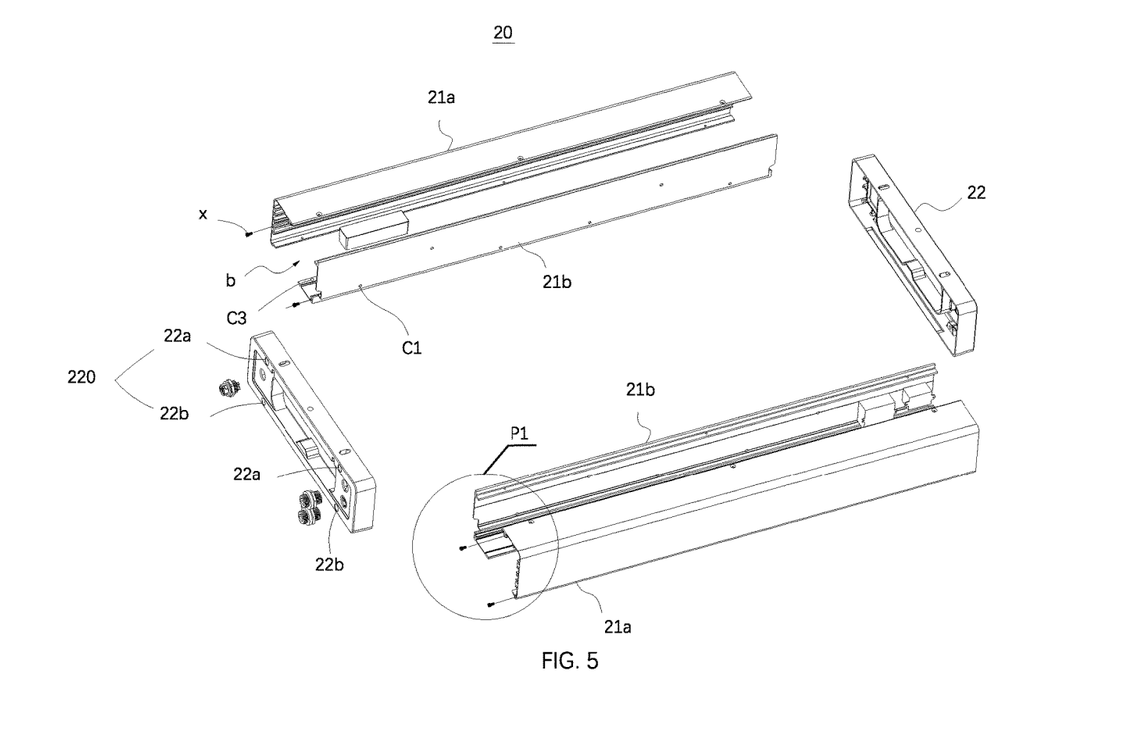
FIG. 5 is an exploded, schematic view of the LED lamp of FIG. 4, but shown that the lamp module is removed.

Referring to FIG. 5, in an embodiment of the present disclosure, the fixing member is a fastening screw x.

In the present disclosure, after completing the above connection and fixation, the inner plate 21b is fixed on the heat sink 101, that is, is fixed on the lamp module 10, and then the outer plate 21a is fixed on the inner plate 21b; at the same time, both the inner plate 21b and the outer plate 21a are to form the cavity b inside the connecting pipe 21, so that the power supply 30 is received in the cavity b.

Referring to FIG. 5, FIG. 10, FIG. 13 and FIG. 14, in order to fix the end cover 22 on the connecting pipe 21, the end cover 22 includes a covering plate 221, an outer frame 222 and an inner frame 223.

The covering plate 221 is fixed to the two connecting pipes and covers on ends of the two connecting pipes 21, and includes an opening D1 thereof. The outer frame 222 extends from an outer edge of the covering plate 221, and wraps around ends of the two connecting pipes 21 and the lamp module 10.

In an embodiment of the present disclosure, the outer frame 222 is preferred to be perpendicular to the covering plate 221 and arranged towards the heat sink 101. When the end cover 22 is fixed on the connecting pipe 21, the outer frame 222 wraps around the ends of the connecting pipe 21 and the heat sink 101. At this time, it can not only enhance the fixation strength between the end cover 22 and the connecting pipe 21 to prevent the connecting pipe 21 from detaching from the heat sink 101, but also seal the ends of the connecting pipe 21 with the cavity b, thereby achieving the purpose of waterproofing.

An edge of the opening D1 extends towards the lamp module 10 to form the inner frame 223 that corresponds to the outer frame 222; two first spaces z1 and a second space z2 that is communicated with the two first spaces z1 are formed between the inner frame 223 and the outer frame 222, the two first spaces z1 respectively arranged on both sides of the inner frame 223 that are opposite to the two connecting pipes 21, and configured to receive the two connecting pipes 21 therein, and the cavity b connected with the two first spaces z1. The second space z2 is arranged between the two first spaces z1 and opposite to the lamp module 10; the wire 40 connected to the lamp module 10 by passing through the cavity b, the two first spaces z1 and the second space z2.

In an embodiment of the present disclosure, in the plurality of fins 1012 of the heat sink 101, a heat dissipation channel 1013 is formed between every two adjacent fins 1012, that is, the heat dissipation channel 1013 is formed between two adjacent fins 1012. The plurality of fins 1012 and the base 1011 are also integrated with each other.

The heat dissipation channel 1013 is connected with the opening D1. In the present embodiment, the opening D1 is arranged in a center of the covering plate 221, and exactly opposite to the heat dissipation channel 1013. In this way, hot air in the heat dissipation channel 1013 can circulate with air outside the end cover 22 through the opening D1, achieving the purpose of heat dissipation. Although the end cover 22 is provided in the present disclosure, the end cover 22 does not affect a heat dissipation performance of the heat sink 101.

Figure 6:
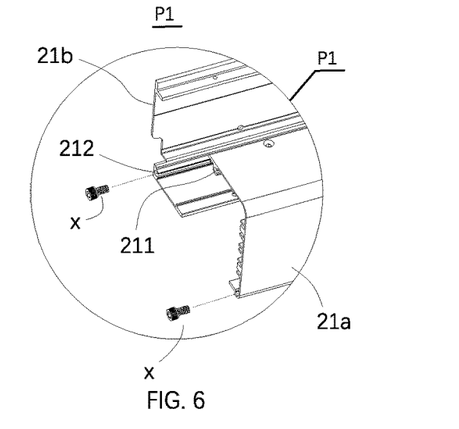
FIG. 6 is a partial enlarged, schematic view of a circle P1 of FIG. 5.
Figure 7:
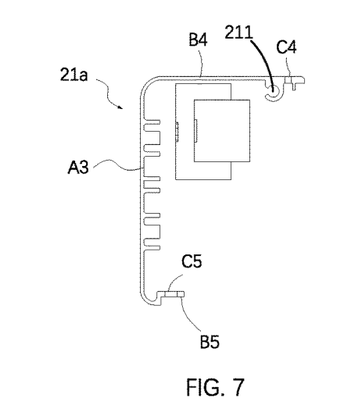
FIG. 7 is a cross-sectional view of an outer plate of the LED lamp of the present disclosure.
Figure 10:
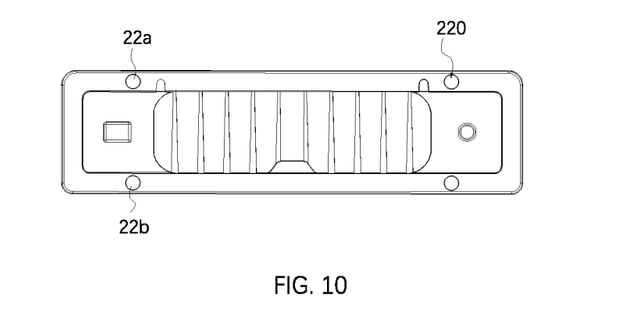
FIG. 10 and FIG. 13 are schematic views of an end cover of the LED lamp of the present disclosure.

Referring to FIG. 6 and FIG. 10, furthermore, the outer plate 21a includes a first installation recess 211 extending to both sides of the outer plate 21a along a length direction of the outer plate 21a, and the inner plate 21b includes a second installation recess 212 extending to both sides of the inner plate 21b along a length direction of the inner plate 21b. A first connecting hole 22a is arranged on the end cover 22 and corresponding to the first installation recess 211, the first installation recess 211 connected to the first connecting hole 22a through the screw x.

A second connecting hole 22b is arranged on the end cover 22 and corresponding to the second installation recess 212, the second installation recess 212 connected to the second connecting hole 22b through the screw x.

The end cover 22 includes two pairs of connecting holes 220 corresponding to the first installation recess 211 and the second installation recess 212.

In an embodiment of the present disclosure, one of the two connecting holes 220 (22a, 22b) of the end cover 22 is fixed to the inner plate 21b and the other of the two connecting holes 220 (22a, 22b) is fixed to the outer plate 21a, and the inner plate 21b and the outer plate 21a are also fixed to each other, which can ensure that better fixation strength occurs among the end cover 22, the inner plate 21b and the outer plate 21a, rather than separating from each other.

In an embodiment of the present disclosure, a cross section of each of the first installation recess 211 and the second installation recess 212 is circular, and the end cover 22 is fixed to the first installation recess 211 and the second installation recess 212 through the screws x passing through the connecting hole 220 and then fixing to the first installation recess 211 and the second installation recess 212.

In an embodiment of the present disclosure, each of the first installation recess 211 and the second installation recess 212 with a circular cross-section is equivalent to a hole, and both the first installation recess 211 and the second installation recess 212 are conveniently and simply fixed to each other by the screws x. Especially, the first installation recess 211 extends along the length of the outer plate 21a, while the second installation recess 212 extends along the length of the inner plate 21b. In this way, even if the inner plate 21b and the outer plate 21a need to be set as a longer length structure to adapt to a larger number of lamp modules 10, the end cover 22 can still fix the inner plate 21b and the outer plate 21a, which improves structural universality of both the inner plate 21b and the outer plate 21a.

Figure 15:
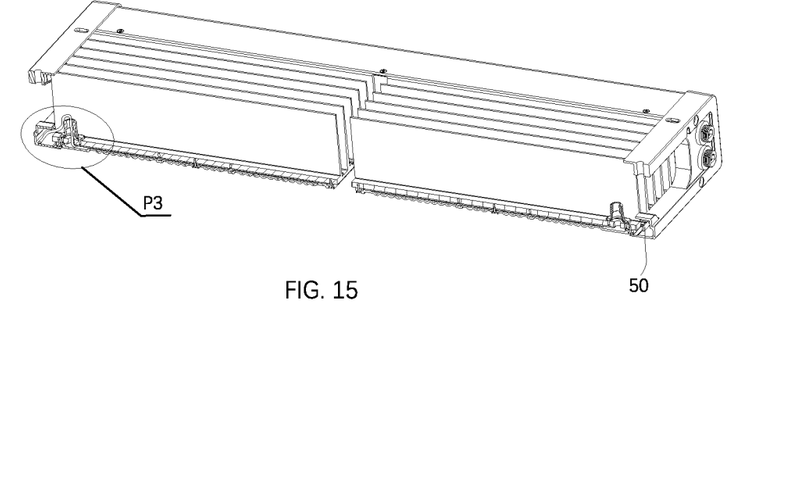
FIG. 15 is a cross-sectional view along a length direction of the lamp module of the LED lamp of the present disclosure.
Figure 16:
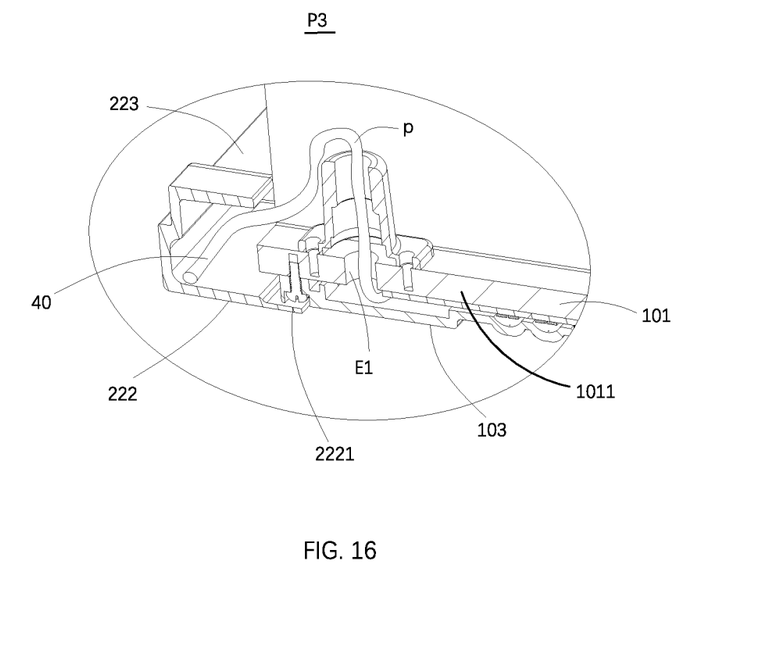
FIG. 16 is a partial enlarged, schematic view of a circle P3 of FIG. 15.

Referring to FIG. 11, FIG. 15 and FIG. 16, the outer frame 222 that forms the second space z2 includes an inner recess 2221 configured to receive the base 1011 or the lampshade 103 therein; ends of the base 1011 or the lampshade 103 are abutted against the inner recess 2221 to obtain limit fixation therebetween.

In an embodiment of the present disclosure, when the base 1011 or the lampshade 103 is placed on the end cover 22, the ends of the base 1011 or the lampshade 103 abut against the inner recess 2221, that is, the ends of the lamp module 10 abut against the inner recess 2221, which can prevent the lamp module 10 from being displaced along a direction perpendicular to the end cover 22, while in a direction parallel to the end cover 22, the lamp module 10 is limited by the outer frame 222 and the two connecting pipes 21 arranged on both sides of the lamp module 10, so that the lamp module 10 will not be displaced.

Figure 17:
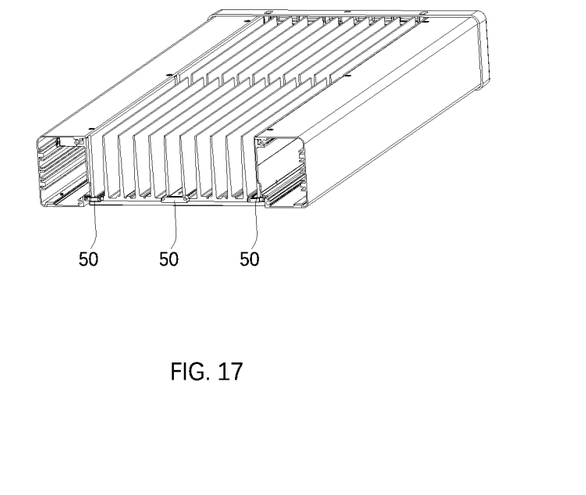
FIG. 17 is a schematic view of the LED lamp with a plurality of blocks of the present disclosure.

Referring to FIG. 15 and FIG. 17, in an embodiment of the present disclosure, a plurality of blocks 50 is arranged on a side of the base 1011 facing the end cover 22, and extends into the second space z2, the plurality of blocks 50 configured to position the wire 40 in the second space z2.

In an embodiment of the present disclosure, the plurality of blocks 50 pushes the wire 40, so that the wire 40 does not come into contact with the heat sink 101, in this way, heat generated from the heat sink 101 will not affect the wire 40, which can effectively avoid a situation that the heat sink 101 ignites the wire 40. In addition, the wire 40 is limited in the second space z2, on the one hand, it can ensure that the wire 40 is more conveniently produced and installed, and on the other hand, it can ensure that the wire 40 is clean and easy to be identified, which is easier to find the wire 40 during later disassembly and maintenance of the LED lamp 100.

In an embodiment of the present disclosure, the wire 40 includes a lead-out end p and the base 1011 includes at least one via-hole E1 connected with the LED module 102; the lead-out end p connected to the LED module 102 through the at least one via-hole E1, and the rest part of the wire 40 with the exception of the lead-out end p, enclosed in the frame 20.

In an embodiment of the present disclosure, the rest part of the wire 40 with the exception of the lead-out end p, is enclosed between the frame 20 and the end cover 22, wherein only a waterproof structure needs to be installed on the lead-out end p to obtain a better electrical waterproofing thereof.

Figure 18:
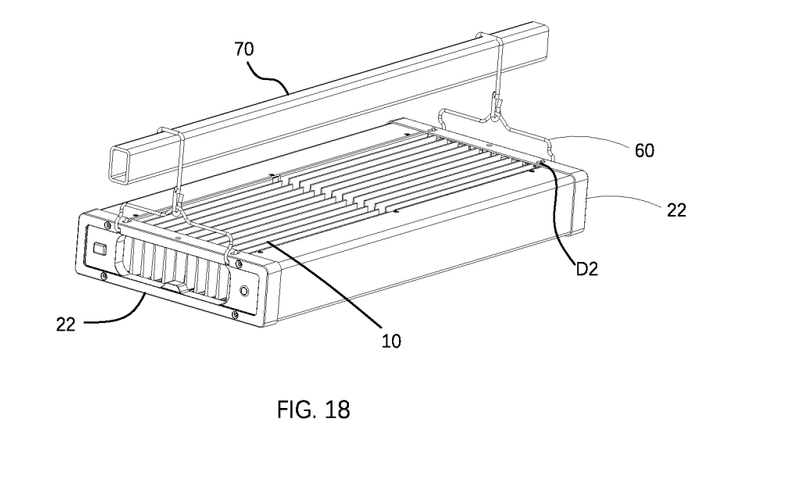
FIG. 18 is a schematic view of an installation way of the LED lamp of the present disclosure.

Referring to FIG. 18, in the present disclosure, the LED lamp 100 is installed on a fixing rod 60 that is arranged above plants. When the LED lamp 100 is connected to the fixing rod 60, illumination light emitted by the lamp module 10 is directed towards the plants, so as to realize illumination of the plants and promote the plants growth.

In an embodiment of the present disclosure, a pair of hanging holes D2 is arranged on each of the two end covers 22 and faces the fixing rod 60. The LED lamp 100 is connected with the end cover 22 through two connecting rods 70 and the fixing rod 60; one end of the connecting rod 70 is connected to the pair of hanging holes D2 of each of the two end covers 22, and the other end of the connecting rod 70 is connected to the fixing rod 60; in this way, the LED lamp 100 is hanged, and the inner recess 2221 set in the end cover 22 plays the role of supporting the lamp module 10, so as to achieve a long-term stable installation of the LED lamp 100.

Figure 19:
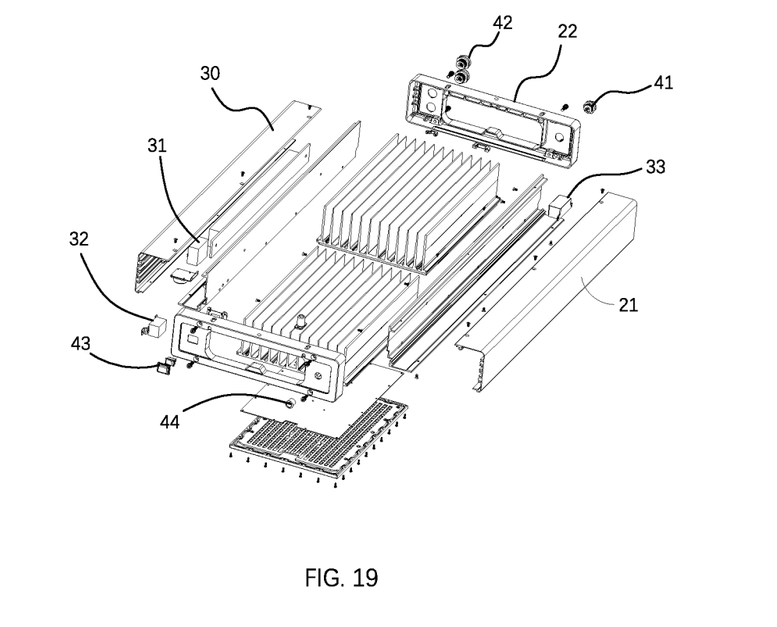
FIG. 19 is an exploded, schematic view of the LED lamp of the present disclosure.
Figure 20:
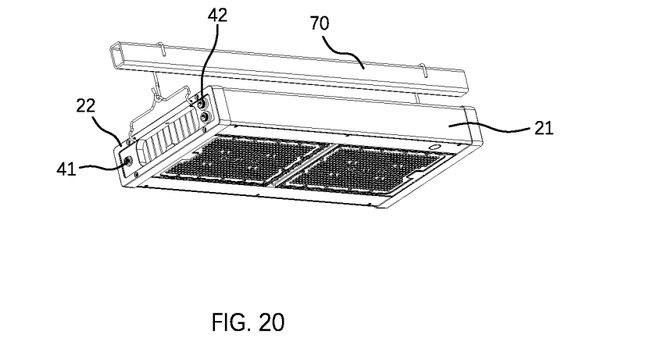
FIG. 20 is similar to FIG. 18, but shown from another view.

Referring to FIG. 19 and FIG. 20, a Bluetooth device 31, a controller 32, and/or a waterproof junction box 33 are arranged inside the two connecting pipes 21. The Bluetooth device 31 is provided to be convenient to remotely control lighting and switching of the LED lamp 100 through a Bluetooth. The controller 32 is configured to control a lighting capacity and a lighting mode of the LED module 102. The waterproof junction box 33 is configured to connect the wire 40 through a waterproof mode.

The end cover 22 includes an AC connector 41, and/or a control signal connector 42, and/or a toggle switch 43, and/or a reset switch 44 formed at positions of the end cover 22 corresponding to the two connecting pipes 21; the AC connector 41 configured to connect the power supply 30 and a mains supply; the control signal connector 42 configured to connect network cables to control luminous parameters of the LED lamp 100 through a network, the toggle switch 43 configured to switch luminous colors or brightness of the LED lamp 100, and the reset switch 44 configured to reset the luminous parameters of the LED lamp 100.

In the present disclosure, the AC connector 41 can be configured to connect the power supply 30 and the mains supply; the control signal connector 42 can be configured to connect the network cables to control luminous parameters of the LED lamp 100 through the network; the toggle switch 43 can be configured to switch luminous colors or brightness of the LED lamp 100, and the reset switch 44 can be configured to reset the luminous parameters of the LED lamp 100, thereby implementing various control modes of the LED lamp 100.

What is claimed is:

1. An LED lamp comprising:
   at least one lamp module having a heat sink, an LED module fixed to the heat sink, and a lampshade positioned over the heat sink to cover the LED module;
   a frame having two connecting pipes, and two end covers clamping the two connecting pipes to cooperatively form a receiving room therebetween, each of the two connecting pipes further including an outer plate and an inner plate, wherein both ends of each outer plate and inner plate are respectively connected to the end cover, with a cavity formed between the outer plate and the inner plate;
   a power supply arranged inside the cavity, wherein the at least one lamp module is provided in the receiving room, and the power supply is electrically connected to the LED module;
   a first installation recess extending to both sides of the outer plate along a length direction;
   a second installation recess extending to both sides of the inner plate along a length direction;
   a first connecting hole arranged on the end cover and corresponding to the first installation recess;
   a first screw connecting the first installation recess to the first connecting hole;
   a second connecting hole arranged on the end cover and corresponding to the second installation recess; and
   a second screw connecting the second installation recess to the second connecting hole.

2. The LED lamp as claimed in claim 1, further comprising at least one of Bluetooth device, a controller, or a waterproof junction box are arranged inside at least one of the two connecting pipes.

3. The LED lamp as claimed in claim 2, at least one of the two end covers further comprises at least one of:
   an AC connector configured to connect the power supply and a mains supply;
   a control signal connector configured to connect network cables to control luminous parameters of the LED plant growing lamp through a network;
   a toggle switch configured to switch luminous colors or brightness of the LED planting growing lamp; and
   a reset switch formed at positions of the end cover corresponding to the two connecting pipes and the reset switch configured to reset the luminous parameters of the LED plant growing lamp.

4. The LED lamp as claimed in claim 1, the inner plate further comprising:
   a first vertical surface;
   a first transverse surface extending from one end of the first vertical surface towards the outer plate;
   a second transverse surface extending from the other end of the first vertical surface towards the outer plate;
   a plurality of first installation holes arranged at intervals in the first vertical surface; and
   a plurality of second installation holes arranged at intervals in the first vertical surface,
   wherein the inner plate is fixed to the lamp module by the first screws engaging with the plurality of first installation holes.

5. The LED lamp as claimed in claim 4, the inner plate further comprises:
   a second vertical surface extending from an end of the second transverse surface away from the first vertical surface;
   a third transverse surface extending from an end of the second vertical surface away from the second transverse surface; and
   a plurality of third installation holes formed on an end of the third transverse surface away from the second transverse surface and arranged at intervals,
   wherein the inner plate is fixed to both ends of the outer plate through the plurality of first installation holes and the plurality of third installation holes, respectively, so as to form the cavity.

6. The LED lamp as claimed in claim 5, the outer plate further comprises:
   a third vertical surface arranged opposite to the first vertical surface;

a fourth transverse surface extending from one end of the third transverse surface and opposite to the third transverse surface;

a fifth transverse surface extending from the other end of the third transverse surface and opposite to the fourth transverse surface;

a fourth installation hole formed on a side of the fourth transverse surface near the first vertical surface; and a fifth installation hole formed on a side of the fifth transverse surface near the first vertical surface, wherein the fourth installation hole is opposite to the second installation hole and fixed to the second installation hole by the second screw, and the fifth installation hole is opposite to the third installation hole and fixed to the third installation hole by a third screw.

7. The LED lamp as claimed in claim 4, the heat sink comprises:

a base fixed to the LED module;

a plurality of fins integrated with the base and extending from one side of the base away from the LED module;

an interior angle is defined between the base and one of the plurality of fins near the inner plate; and an exterior angle defined between the first vertical surface and the second transverse surface, wherein the first vertical surface is fixed to the one of the plurality of fins near the inner plate, and the interior angle coincides with the exterior angle, so that the first vertical surface abuts against the one of the plurality of fins near the inner plate, and the second transverse surface abuts against the base.

8. The LED lamp as claimed in claim 7, wherein a width of the second transverse surface is the same as a width from the one of the plurality of fins near the inner plate to an edge of the base, and when the first vertical surface is fixed to the one of the plurality of fins near the inner plate, an end of the base abuts against the second vertical surface.

9. The LED lamp as claimed in claim 1, at least one of the two end covers further comprises:

a covering plate fixed to the two connecting pipes and covering respective ends of the two connecting pipes, and comprising an opening thereof; and an outer frame extending from an outer edge of the covering plate, and wrapping around ends of the two connecting pipes and the lamp module.

10. The LED lamp as claimed in claim 9, the at least one of the two end covers further comprises:

an inner frame formed by an edge of the opening that extends towards the lamp module corresponding to the outer frame; and two first spaces and a second space formed between the inner frame and the outer frame, wherein the two first spaces are respectively arranged on both sides of the inner frame that are opposite to the two connecting pipes, and configured to receive the two connecting pipes therein, and the cavity is connected with the two first spaces, the second space is arranged between and communicating with the two first spaces, and opposite to the lamp module, and the wire is connected to the lamp module by passing through the cavity, the two first spaces and the second space.

11. The LED lamp as claimed in claim 10, the heat sink further comprises:

a base fixed to the LED module;

a plurality of fins arranged at intervals and extending from one side of the base away from the LED module, and integrated with the base; a heat dissipation channel formed between two adjacent heat dissipation fins and communicated with the opening.

12. The LED lamp as claimed in claim 11, the outer frame further comprises an inner recess configured to receive the base or the lampshade therein, such that ends of the base or the lampshade are abutted against the inner recess.

13. The LED lamp as claimed in claim 12, further comprising a plurality of blocks is arranged on a side of the base facing the at least one of the two end covers, and extending into the second space, wherein the plurality of blocks are configured to position the wire in the second space.

14. The LED lamp as claimed in claim 13, the wire further comprises a lead-out end, and the base further comprises at least one via-hole connected with the LED module, wherein the lead-out end is connected to the LED module through the at least one via-hole, and the lead-out end is enclosed in the frame.

* * * * *